Figure 1:
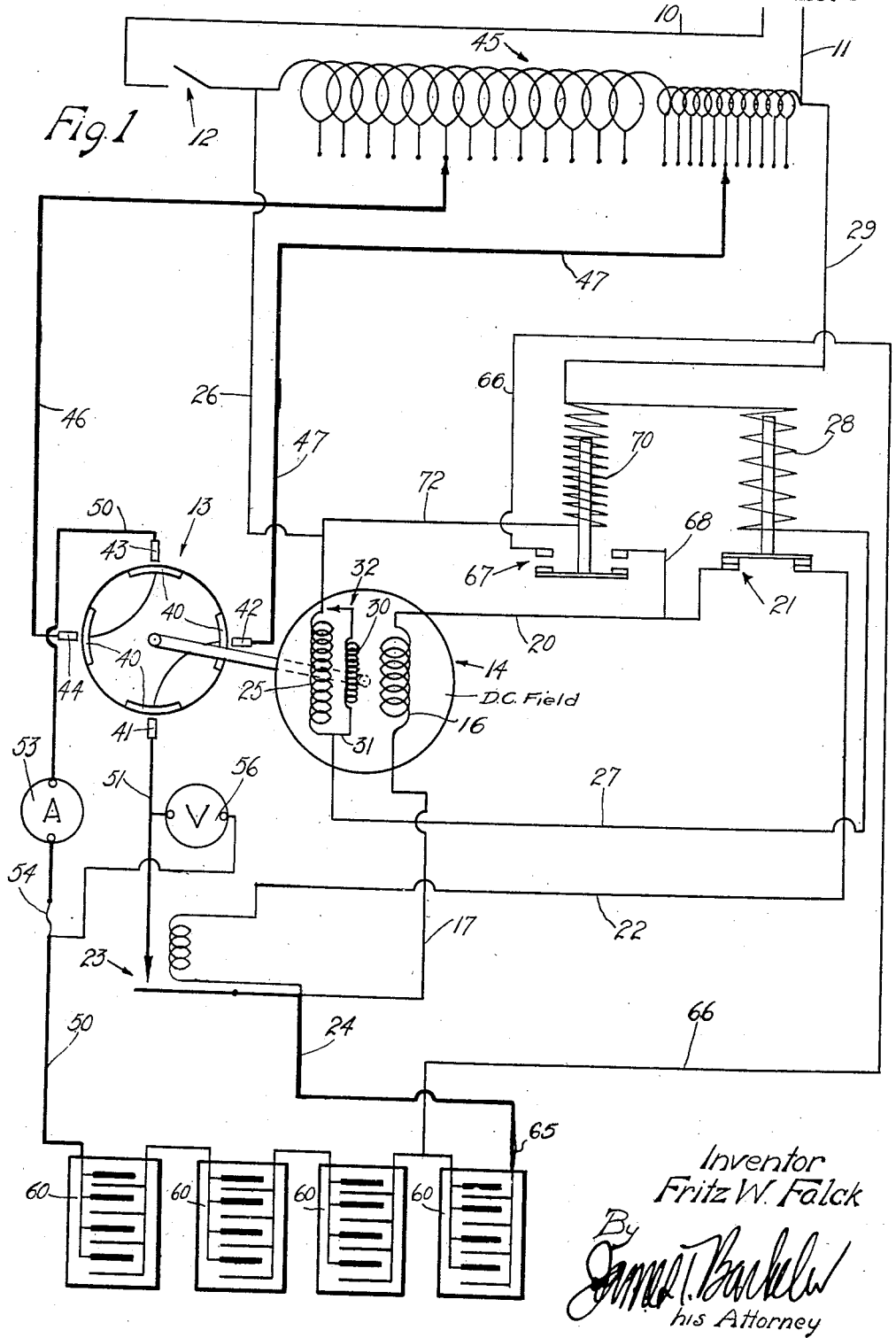

Sept. 16, 1924.

F. W. FALCK 1,508,544

AUTOMATIC SYNCHRONOUS RECTIFYING MECHANISM

Filed Jan. 31, 1921    2 Sheets-Sheet 1

Inventor
Fritz W. Falck
By
his Attorney

Sept. 16, 1924.          F. W. FALCK          1,508,544
AUTOMATIC SYNCHRONOUS RECTIFYING MECHANISM
Filed Jan. 31, 1921          2 Sheets-Sheet 2

Inventor
Fritz W. Falck
By
his Attorney

Patented Sept. 16, 1924.

1,508,544

UNITED STATES PATENT OFFICE.

FRITZ W. FALCK, OF LOS ANGELES, CALIFORNIA.

AUTOMATIC SYNCHRONOUS RECTIFYING MECHANISM.

Application filed January 31, 1921. Serial No. 441,195.

*To all whom it may concern:*

Be it known that I, FRITZ W. FALCK, a citizen of the United States, residing in Los Angles, county of Los Angeles, State of California, have invented new and useful Improvements in Automatic Synchronous Rectifying Mechanism, of which the following is a specification.

This invention has to do with a rectifying mechanism and it is an object of the invention to provide an automatic synchronous rectifier such as may be used in charging batteries and for similar purposes.

The present invention is particularly applicable for use in charging storage batteries so, therefore, I am herein disclosing and describing it as applied to charging storage batteries. It is to be understood, however, that the invention is broad in its scope and is not specifically limited to any particular use such, for instance, as is herein set forth to facilitate a clear description.

In the case of charging storage batteries it is essential that a certain minimum current be applied to the batteries. If this charging current drops below a certain voltage the batteries discharge. With ordinary battery charging apparatus of this character it is necessary before putting the batteries in the charging line to determine whether or not the polarity in the line is correct. When the apparatus is in operation and the batteries are in the line a drop in the supply current will cause actuation of a circuit breaker and thus turn off the whole apparatus. The apparatus remains off until it is again started in the manner above outlined. This apparatus and manner of operation is inconvenient and impractical in that it requires considerable attention upon starting and requires more or less constant attention because it must be manually started every time it is thrown off.

An object of the present invention is to provide a rectifying mechanism which will always supply current of the same polarity to the charging line. With the present apparatus the polarity of the charging line is always the same and it is never necessary to test the polarity or to start and stop the apparatus several times to get the proper polarity. This is of particular importance as it greatly simplifies starting and cooperates in carrying out other objects of the invention.

Another noteworthy object of the invention has been to provide an automatic rectifying means, that is, a rectifying mechanism which is automatically cut off with a drop of the supply current but which will also automatically start when said current becomes normal. It is unnecessary for an attendant to be present to start the apparatus upon its being cut off thus greatly reducing the cost of operation. The fact that the apparatus will always start with the proper polarity, assures proper operation when the apparatus starts automatically as well as when it is started manually.

Another particularly important feature of the invention is the provision of a rotary rectifying apparatus which will not spark. The invention provides a combination and arrangement which eliminates sparking at the rectifying apparatus and thus obviates one of the greatest undesirable features of this type of apparatus.

The various objects and features of the invention will be best and more fully understood from the following detailed description of a preferred form of the invention throughout which reference is had to the accompanying drawings in which—

Figure 2:
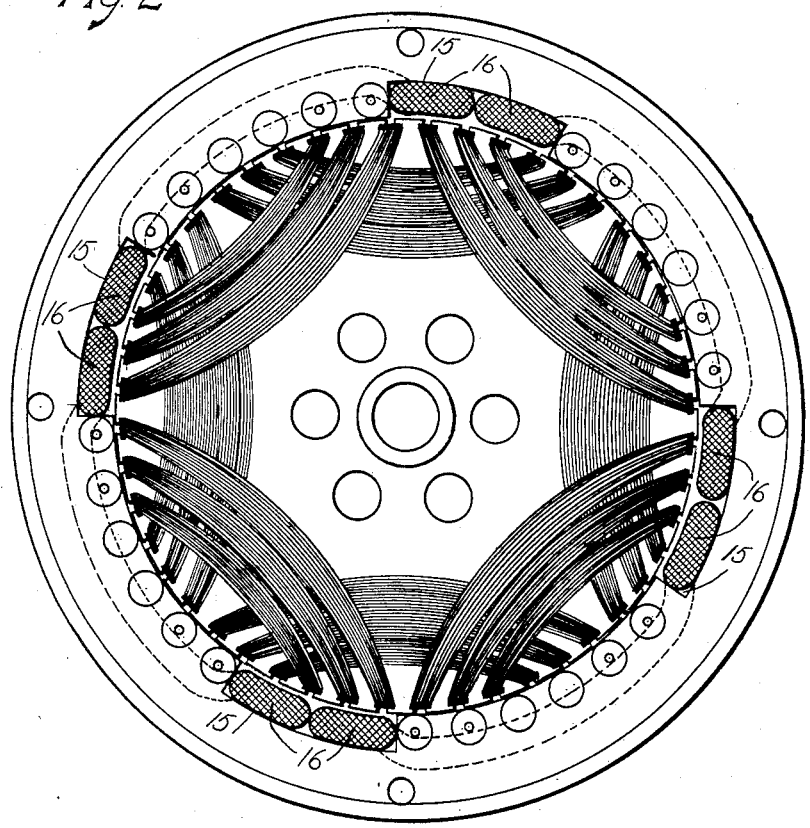

Fig. 1 is a diagram embodying the present invention and Fig. 2 is a more or less diagrammatic sectional view of a motor provided for carrying out the present invention.

Throughout the drawings numerals 10 and 11 represent wires carrying the main supply current (alternating current). A suitable control switch 12 is provided in connection with one of these wires. Current from the main wires 10 and 11 is supplied to a rectifying mechanism 13 actuated by a motor mechanism 14. The motor 14 is also supplied with current from the main wires 10 and 11.

The rectifying mechanism shown in the diagram has four segments 40 arranged 90° apart around the rotating member and connected in pairs as clearly shown in the diagram. Four stationary brushes 41, 42, 43 and 44 are arranged 90° apart around the rotating member. Brushes 44 and 42 which are diametrically opposite each other are connected to wires 46 and 47 respectively.

The wires 46 and 47 connect to a transformer 45 connected to the main wires 10 and 11. The brushes 41 and 43 are connected with wires 51 and 50, respectively, which carry the direct, or charging, current from the rectifying mechanism which is positively connected with the motor and in the apparatus indicated in the diagram is adapted to be directly connected with the motor. It will be readily understood how the rotating member of the rectifying mechanism, when rotated at proper speed, receives alternating current from the main wires 10 and 11 through the transformer and converts it into direct current which is taken off by the wires 50 and 51.

In the present disclosure of the invention I show a series of batteries 60 connected with the wires 50 and 51 in such manner as to be charged with the direct current from the rectifying mechanism. I show the wire 50 connected directly to one end of the series of batteries and the wire 51 connected to the other end through a circuit breaker 23. It will be understood, of course, that any desired number of batteries may be carried on the charging line and further that the invention is not specifically limited to batteries being employed in connection with the apparatus of the present invention.

The transformer 45 between the wires 10 and 11 and the wires 46 and 47 is an induction transformer and preferably what is known as an auto-transformer. With a device of this character the current going to the rectifying devices can be regulated in voltage by inductive resistance and without varying its phase. In the transformer indicated in the diagram the connection of the wire 46 with the transformer is adjustable to vary or regulate the voltage in the circuit to the rectifying devices in comparatively large steps, while the connection of the wire 47 is adjustable to vary or regulate the voltage in comparatively small steps or in steps which are fractional parts of the steps in which the wire 46 is adjustable. Regulation of voltage thus obtained in the A. C. line of course regulates the voltage in the D. C. line 50, 51. In the preferred form of the invention an ammeter 53 is arranged in the charging line, and a voltmeter 56 is arranged across the charging wires. Further, it is preferred to provide a fuse 54 in the charging line.

The circuit breaker 23 connecting wires 51 and 24 is energized from a battery and is adapted to close the connection between the wires 51 and 24 when it is energized. When the direct current of line 50, 51 is being used to charge a battery or batteries then one of those may be used to energize the circuit breaker, and also the motor field winding 16, as hereinafter pointed out. Otherwise a special battery or any other suitable source of current may be used. The circuit breaker winding may be connected to one side of said battery by wires 24 and 65 and to the other side by wire 66 and thence through relay 67, wire 68, relay 21 and wire 22.

The motor 14 is a synchronous motor, and in accordance with the present invention has definite field poles. In carrying out the invention an ordinary single phase split phase induction motor may be employed by slotting its field and providing field windings in the slots so that the field is definitely polarized. The particular motor illustrated in Fig. 2 of the drawings is a single phase split phase motor. Slots 15 are provided in the stator and field windings 16 are arranged in the slots. There are four slots arranged 90° apart around the stator and there are four coils, or field windings arranged in the slots. The windings 16 are so connected and arranged that the stator has two N poles diametrically opposite each other and two S poles 90° from the N poles and diametrically opposite each other. The windings 16 are energized or excited with direct current, say from a battery. In the preferred form of the invention the windings 16 are excited from the battery 60 which energizes the circuit breaker 23. The windings are connected with the wire 24 by a wire 17 and are connected with the wire 68 by a wire 20. From the diagram it will be readily seen how these connections connect the windings 16 in the battery circuit through the relay 67. The rotor of the motor embodies running windings 25 and starting windings 30. The running winding 25 is connected with wire 10 by a wire 26 and with wire 11 by wire 27, through the winding 28 of relay 21 and by wire 29. By this arrangement it will be seen that the winding of the relay 21 is in series with the rotor or running windings of the motor. The winding of the relay 21 is such that it is particularly sensitive to drop or change in amperage. The starting windings 30 are connected in parallel with the running windings by a wire 31 and an automatic control device 32. The control device operates so that the starting windings are energized only when the motor is starting or is running at a low speed.

With the field definitely polarized in the manner above set forth the motor will not only operate synchronously but its parts will be in certain or definite relative positions when the motor is operating synchronously. This is of particular importance as will be understood from the description to follow. The motor when starting and when out of synchronism draws excessive amperage and is more or less inefficient, but immediately upon its getting into synchronism it operates at maximum efficiency and the amperage drops materially.

The relay 21 is adapted to open to break the connection between the wire 22 and the wires 68 and 20 when it is fully energized and is adapted to close to make connection between said wires when it is not fully energized. As before stated the winding of relay 21 is particularly sensitive to change in amperage and in practice it is such that the relay is energized and open only when the motor is out of synchronism or is drawing excessive amperage. The drop in amperage when the motor gets into synchronism is sufficient to allow the relay 21 to close.

The relay 67 is adapted to be closed to connect wires 68 and 66 when it is energized and is adapted to be open when not energized. The winding 70 of relay 67 is connected with wire 10 by wires 72 and 26 and with wire 11 by wire 29. With this arrangement the relay 67 is energized and closed when the switch 12 is closed and the motor is in operation.

When the apparatus is not in operation the switch 12 is open, the motor is not operating, the relay 67 is open, the relay 21 is closed, and the circuit breaker 23 is open. Immediately upon closing the switch 12 to start the apparatus the relay 67 is closed thus closing the battery circuit through the field winding 16 of the motor, and the running and starting windings of the motor are energized, and alternating current is supplied to the converter. The relay 21 is open due to the motor drawing excessive amperage. With the windings of the motor energized the motor starts operation and when it is well started the automatic control device 32 cuts out the starting windings 30. The motor increases in speed until its parts are moving in synchronism with the pulsations of the alternating current being supplied to it. Upon the motor thus falling into synchronism it instantaneously draws considerably less amperage thus allowing the relay 21 to close. Closing of the relay 21 closes the battery circuit which carries the circuit breaker 23 and thus energizes and closes the circuit breaker, which up to this point has been open. With the circuit breaker closed the wires 24 and 51 are connected allowing the direct current from the rectifying devices to flow through and charge the batteries. If for any reason, as by main current fluctuation, the motor gets out of step the relay 21 will immediately open because of the motor drawing excessive amperage. When the relay 21 opens the circuit breaker 23 is deenergized and opened thus cutting off the batteries. When the motor gets back into step the relay 21 again closes, putting the batteries back in the charging line.

The relay 67, being arranged to control the connection of wires 68 and 66 and being energized from the wires 10 and 11, controls the battery circuits which carry the circuit breaker 23 and windings 16 so that the circuit breaker winding and field windings are cut off, or are not energized, when the apparatus is out of operation. For instance, when the switch 12 is opened or when the supply current goes off the relay 67 is deenergized thus breaking the connection between wires 66 and 68 and thus opening the battery circuits to both the circuit breaker and the field winding. With this arrangement the windings 16 and circuit breaker are not left energized when the apparatus is not in operation.

With the motor provided by the invention the polarity of the direct current delivered to the batteries is the same regardless of how the motor is started or what relative positions the parts of the motor may be in when the motor is started. The positive polarizing of the motor field causes the motor to get into synchronism with its parts in definite relative positions. With the rectifying mechanism directly connected with the motor its parts must also assume a definitely relative positioning when the motor is in synchronism. The motor and rectifying devices are arranged in such relation that they operate to deliver direct current to the charging line in one certain direction when the motor is in synchronism. It may be here stated that it has been found in practice that by definitely polarizing the field, the motor is not only made to come into synchronism with its parts in definite relative positions but its efficiency and power is also materially increased in some cases as high as 50%.

From the foregoing description it will be readily understood how the apparatus of the present invention may be properly and safely started merely by closing the main control switch 12, and that the apparatus will continue in proper operation to charge batteries without an attendant and regardless of whether the main circuit is perfectly steady or not. For instance, in the practical operation of the apparatus the operator may close the switch 12 to start the apparatus and may then leave it until he desires to turn it off. If the main circuit current drops at any time during the operation of the apparatus the batteries will not discharge because of the fact that they will be disconnected from the charging line by the circuit breaker. This makes the operation of the apparatus entirely automatic. The polarity of the charging line is always correct without testing and starting and stopping the apparatus and the batteries are cut off and on so that they are only in the charging line when the proper current is flowing.

Another feature of the present apparatus is the arrangement and combination which eliminates all sparking at the rectifying device. By regulating the alternating current, supplied to the rectifying device by inductive resistance its phase is not altered or changed relative to that of the current going to the motor in such manner as might cause the motor and rectifying device to operate slightly out of synchronism. For instance, if the phase of the current to the rectifying device is slightly retarded or changed so that the current operating the motor and that going to the rectifying device are not in perfect unison or step there will be sparking between the contacts and brushes of the rectifying device such as will make replacement and continual repairs necessary.

Having described only a preferred form of my invention I do not wish to limit or restrict myself to the particular details hereinabove set forth but wish to reserve to myself any changes or variations that may appear to those skilled in the art or that may fall within the scope of the following claims.

Having described a preferred form of my invention, I claim:

1. In apparatus of the character described, a synchronous motor, rectifying means operatively connected with the motor, a battery connected with the discharge of the rectifying means, and means for controlling the connection between the rectifying means and battery controlled by the amount of current drawn by the motor.

2. In apparatus of the character described, a battery, a synchronous motor, means in the motor to cause the parts of the motor to be in certain relative positions when the motor is operating synchronously, said means embodying windings energized by the battery, a rectifying mechanism operatively connected with the motor, the motor and rectifying mechanism being energized from the same circuit, means connecting the discharge of the rectifying mechanism with the battery, means for regulating the energy supplied to the rectifying mechanism without effecting its phase, and means for controlling said connecting means so that the rectifying mechanism and battery are connected only when the motor is operating synchronously, said means comprising a relay adapted to actuate with change in the amount of current passing through the motor.

3. In apparatus of the character described, a battery, a synchronous motor, means in the motor to cause the parts of the motor to be in certain relative positions when the motor is operating synchronously, said means embodying windings energized by the battery, a rectifying means operatively connected with the motor, the motor and rectifying means being energized from the same circuit, means connecting the discharge of the rectifying means with the battery, means for regulating the energy supplied to the rectifying means without effecting its phase, and means for controlling said connecting means so that the rectifying means and battery are connected only when the motor is operating synchronously, said means comprising a circuit breaker, and a relay adapted to be actuated by decrease in impedance of the motor upon its getting out of synchronism, to open the circuit breaker.

4. In apparatus of the character described, a synchronous motor embodying a slotted field part, windings in the slots to carry direct current and saliently polarize the field part, and a part adapted to receive and deliver alternating current in synchronism with the motion of the motor, a battery connected with the windings to energize them, a rectifying means having direct connection with the motor, the motor and rectifying means being energized from the same circuit, inductive resistance arranged to regulate the energy passing to the rectifying means, means connecting the discharge of the rectifying means and the battery said means embodying a circuit breaker energized from a circuit from the battery, and a relay arranged in series with the last mentioned part of the motor to control said last mentioned circuit, said relay being adapted to be actuated by change in the impedance of the motor to close the circuit breaker only when the motor is in synchronous operation, and means to automatically control the circuits energized by the battery so that no current flows when the circuit energizing the rectifying means and motor is off.

5. In apparatus of the character described, a synchronous motor, a rectifying device operated by the motor and adapted to convert alternating current to direct current, an alternating current circuit leading to the motor and to the rectifying device, a direct current circuit leading from the rectifying device to the battery, a switch in said circuit, and electro-magnetic means in the alternating current circuit leading to the motor and adapted to open said switch when excessive current flows in that circuit as described.

In witness that I claim the foregoing I have hereunto subscribed my name this 29th day of December, 1920.

FRITZ W. FALCK.

Witness:
VIRGINIA BERINGER.